(12) United States Patent
Wu et al.

(10) Patent No.: US 9,100,083 B2
(45) Date of Patent: Aug. 4, 2015

(54) RADIO-FREQUENCY FRONT-END SUPPORTING MULTIPLE WIRELESS COMMUNICATION STANDARDS

(71) Applicant: MEDIATEK INC., Hsin-Chu (TW)

(72) Inventors: Chia-Hsin Wu, New Taipei (TW); Chih-Hsien Shen, Hsinchu County (TW); Jui-Lin Hsu, Tainan (TW); Chih-Hung Lee, Chiayi Hsien (TW); Yi-An Li, Taichung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 445 days.

(21) Appl. No.: 13/798,063

(22) Filed: Mar. 12, 2013

(65) Prior Publication Data

US 2013/0309979 A1  Nov. 21, 2013

Related U.S. Application Data

(60) Provisional application No. 61/649,692, filed on May 21, 2012.

(51) Int. Cl.
*H04B 1/16* (2006.01)
*H04B 1/00* (2006.01)

(52) U.S. Cl.
CPC . *H04B 1/16* (2013.01); *H04B 1/006* (2013.01)

(58) Field of Classification Search
CPC .......................................................... H04B 1/16
USPC ............................................................ 455/73
See application file for complete search history.

(56) References Cited

U.S. PATENT DOCUMENTS

| 2006/0222100 | A1* | 10/2006 | Behzad ........................ 375/267 |
| 2007/0207751 | A1  | 9/2007  | Behzad |
| 2007/0207752 | A1* | 9/2007  | Behzad ........................ 455/132 |
| 2007/0243832 | A1* | 10/2007 | Park et al. .................... 455/73 |
| 2009/0180466 | A1* | 7/2009  | Soul et al. .................... 370/350 |
| 2009/0239471 | A1  | 9/2009  | Tran |
| 2012/0026039 | A1* | 2/2012  | Ganeshan et al. ........ 342/357.73 |

FOREIGN PATENT DOCUMENTS

CN          100583663 C    1/2010

* cited by examiner

*Primary Examiner* — David Bilodeau
(74) *Attorney, Agent, or Firm* — Winston Hsu; Scott Margo

(57) ABSTRACT

A radio-frequency (RF) front-end supporting at least a first and second wireless communication bands includes a mixer arranged for mixing a received signal with a first local oscillation signal when the shared receiver front-end performs the reception operation according to the first wireless communication band, and for mixing the received signal with a second local oscillation signal when the shared receiver front-end performs the reception operation according to the second wireless communication band, wherein the first and second local oscillation signals are different in frequency.

13 Claims, 3 Drawing Sheets

RADIO-FREQUENCY FRONT-END SUPPORTING MULTIPLE WIRELESS COMMUNICATION STANDARDS

CROSS REFERENCE TO RELATED APPLICATIONS

This application claims the benefit of U.S. Provisional Application No. 61/649,692, filed May 21, 2012, and included herein by reference.

BACKGROUND

The disclosed embodiments of the present invention relate to chip area reduction, and more particularly, to a shared radio-frequency (RF) architecture of a receiver front-end supporting multiple wireless communication standards.

Both wireless fidelity (Wi-Fi) and Bluetooth (BT) operate in the free 2.4 GHz Industrial, Scientific and Medical (ISM) band; it is generally acknowledged that Wi-Fi and Bluetooth are two of the most widely used wireless technologies in consumer electronic devices. As a result, more and more handheld devices are being shipped with both Wi-Fi and Bluetooth functionalities.

Using separated Wi-Fi and Bluetooth dies on one embedded device, however, will increase cost, chip area and pin count. Although some solutions have been proposed to co-locate Wi-Fi and Bluetooth functional blocks in one integrated chip in order to lower the cost, these solutions do not address the problem of reducing chip area and pin count. Please refer to FIG. 1, which is a block diagram illustrating a traditional architecture of a dual-mode (Wi-Fi and Bluetooth) front-end 100. The dual-mode front-end 100 includes a Wi-Fi module 120 and a BT module 140. The Wi-Fi module 120 includes a Wi-Fi receiver (RX) front-end 122, a Wi-Fi transmitter (TX) front-end 124 and a Wi-Fi intermediate frequency (IF) circuit 126. The BT module 140 includes a BT RX front-end 142, a BT TX front-end 144 and a BT IF circuit 146. As illustrated in FIG. 1, the Wi-Fi RX front-end 122 and the BT RX front-end 142 are separated from each other, and therefore have their own mixer, synthesizer, local oscillation (LO) generator, etc.

There is a need, therefore, for a shared radio-frequency (RF) architecture of a receiver front-end which can support multiple wireless communication standards to reduce chip area.

SUMMARY

In accordance with exemplary embodiments of the present invention, a shared radio-frequency (RF) architecture of receiver front-end supporting multiple wireless communication standards is proposed to address the above-mentioned issue.

According to a first aspect of the present invention, an exemplary radio-frequency (RF) front-end supporting at least a first and second wireless communication bands is disclosed. The RF front-end comprises a mixer arranged for mixing a received signal with a first local oscillation signal when the shared receiver front-end performs the reception operation via the first wireless communication band, and for mixing the received signal with a second local oscillation signal when the shared receiver front-end performs the reception operation via the second wireless communication band, wherein the first and second local oscillation signals are different in frequency.

According to a second aspect of the present invention, an exemplary radio-frequency (RF) front-end supporting at least a first and second wireless communication bands is disclosed. The RF front-end comprises at least one transmitter front-end, a shared receiver front-end, a first synthesizer, a second synthesizer and a local oscillation (LO) generator. The transmitter front-end arranged is arranged for performing a transmission operation via the first wireless communication band. The shared receiver front-end is arranged for performing a reception operation via either the first wireless communication band or the second wireless communication band. The first synthesizer is arranged for generating a first frequency signal. The second synthesizer is arranged for generating a second frequency signal. The local oscillation (LO) generator is arranged for generating first and second local oscillation signals by the first and second frequency signals, respectively, and outputting one of the first local oscillation signal and the second local oscillation signal to one of the transmitter front-end and the shared receiver front-end when a corresponding operation is performed, wherein the first and second local oscillation signals are different in frequency.

According to a third aspect of the present invention, an exemplary radio-frequency (RF) front-end supporting at least a first and second wireless communication bands is disclosed. The RF front-end includes a shared front-end, a first synthesizer, a second synthesizer and a LO generator. The shared front-end is arranged for performing an operation via either the first wireless communication band or the second wireless communication band. The first synthesizer is arranged for generating a first frequency signal. The second synthesizer is arranged for generating a second frequency signal. The LO generator is arranged for generating first and second local oscillation signals by the first and second frequency signals, respectively, and outputting one of the first local oscillation signal and the second local oscillation signal to the shared front-end when a corresponding operation is performed. The RF front-end is operative for a time division duplexing (TDD) scheme, and the first synthesizer and the second synthesizer are both active over a period of a time slot operated by the TDD scheme.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

A concept of the present invention is to share one or more front-end components of a receiver that operating via different wireless communication bands. The wireless communication bands may be included in specified spectrums defined by at least one of a first and second wireless communication standards, such as a Bluetooth (BT) standard and a wireless fidelity (Wi-Fi) standard, in order to reduce chip area and pin count. For example, the wireless communication bands may be all included different specified spectrums defined by the first communication standard (e.g., BT 2.4G band and 5G band), or some of the wireless communication bands may be included the specified spectrums defined by the first communication standard (e.g., BT 2.4G band) while the other wireless communication bands may be included the same specified spectrums defined by the second communication standard (e.g., W-Fi 2.4G band), or some of the wireless communication bands may be included the specified spectrums defined by the first communication standard (e.g., BT 5G band) while the other wireless communication bands may be included different specified spectrums defined by the second communication standard (e.g., W-Fi 2.4G band). Since the front-end components of the receiver are shared, traces between the shared components are also shared, thus further reducing chip area and pin count. Further details are described as follows.

Figure 1:
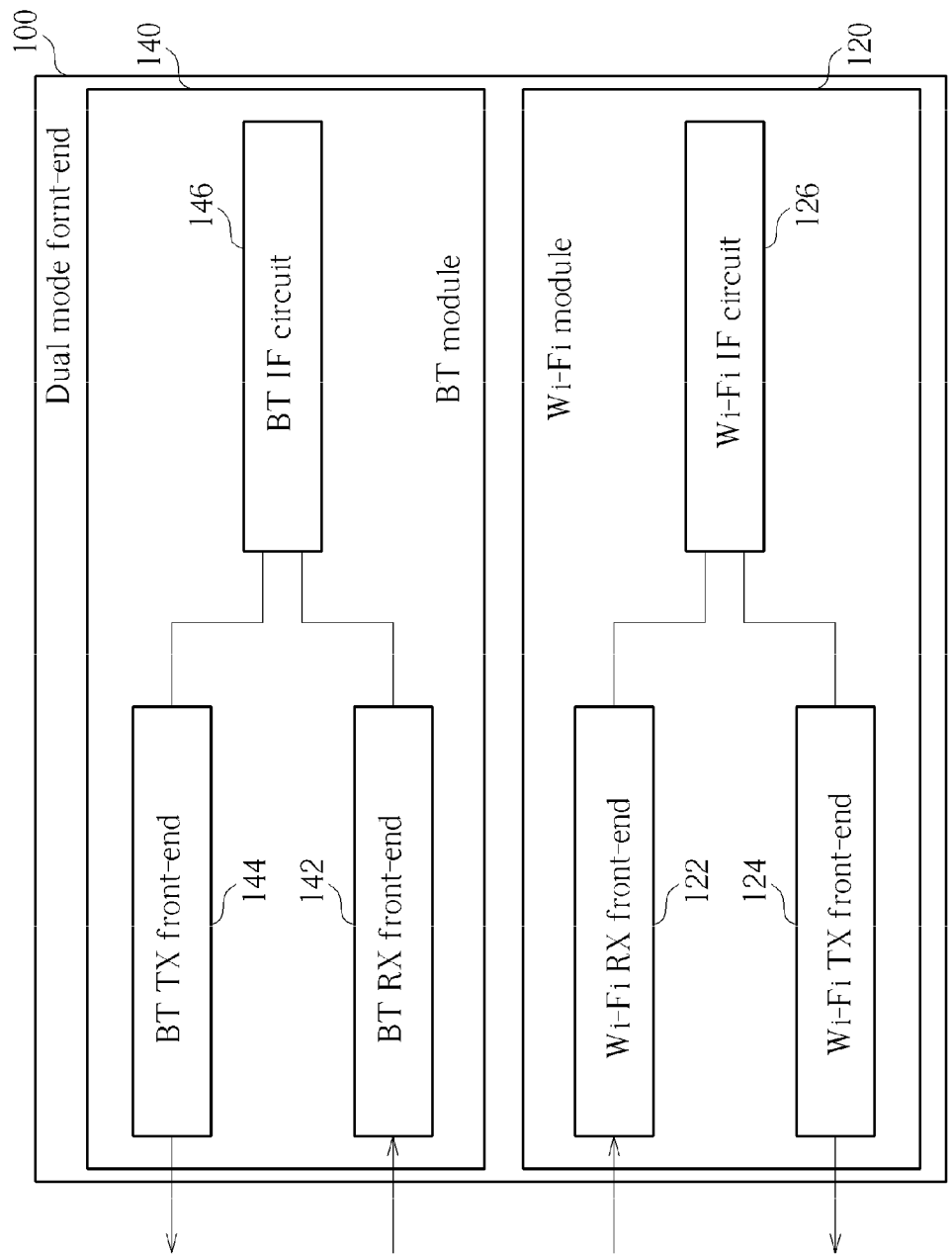
FIG. 1 is a block diagram illustrating a traditional architecture of a dual-mode front-end.
Figure 2:
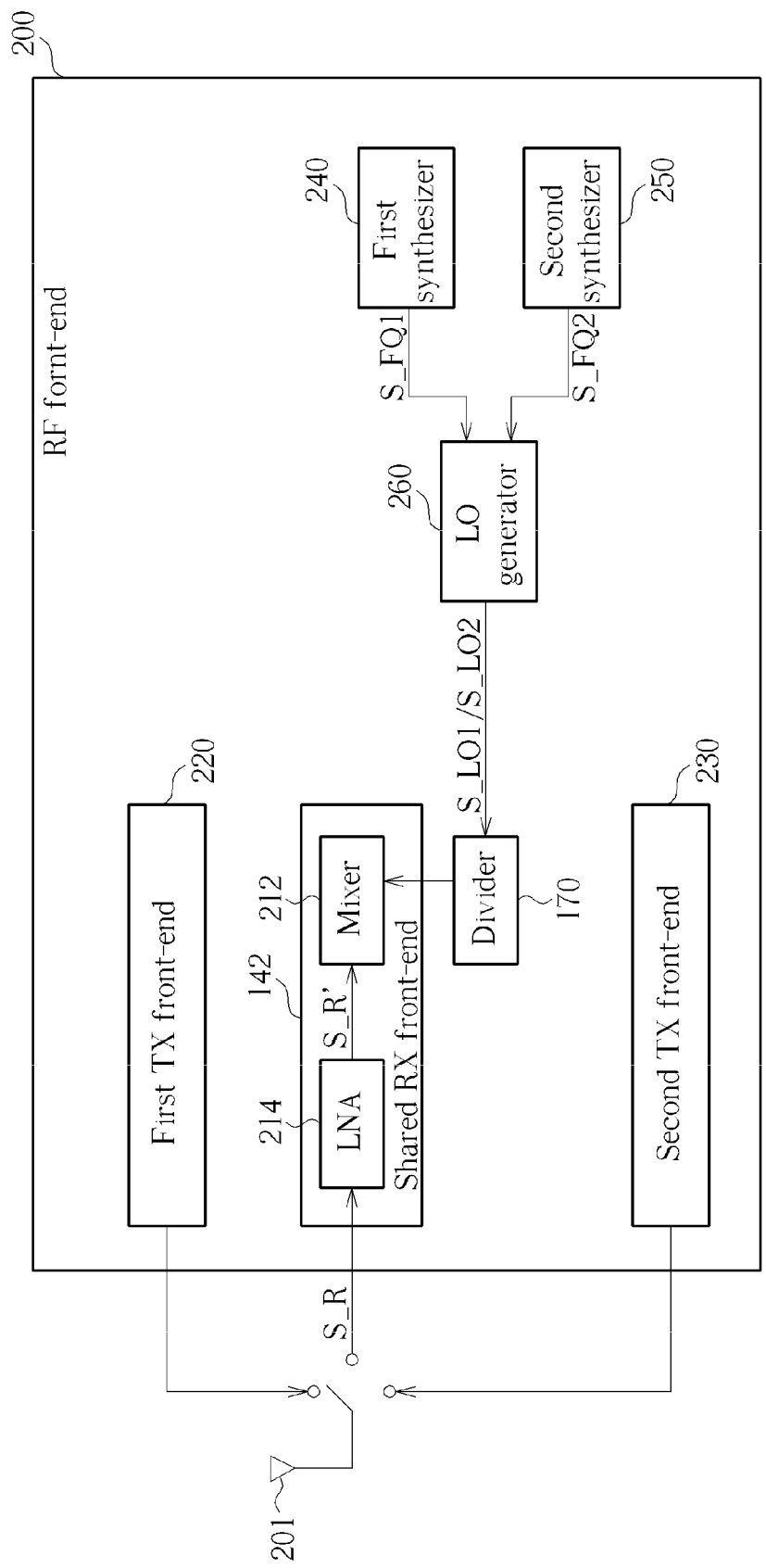
FIG. 2 is a block diagram illustrating a radio-frequency front-end supporting multiple wireless communication standards according to an embodiment of the present invention.

Please refer to FIG. 2, which is a block diagram illustrating a radio-frequency (RF) front-end 200 supporting multiple wireless communication standards according to an embodiment of the present invention. By way of example, but not limitation, the multiple wireless communication standards may include at least a BT standard and a Wi-Fi standard. The RF front-end 200 includes, but is not limited to, a shared RX front-end 210, a first TX front-end 220, a second TX front-end 230, a first synthesizer 240, a second synthesizer 250, a local oscillation (LO) generator 260 and a divider 270. The shared RX front-end 210 includes a mixer 212 and a low-noise amplifier (LNA) 214. The first synthesizer 240 is arranged for generating a first frequency signal S_FQ1 according to a first wireless communication standard (e.g. the BT standard), and the second synthesizer 250 is arranged for generating a second frequency signal S_FQ2 according to a second wireless communication standard (e.g. the Wi-Fi standard). The LO generator 260 is coupled to the first synthesizer 240 and the second synthesizer 250, and arranged for generating a first local oscillation signal S_LO1 by referring to the first frequency signal S_FQ1 and a second local oscillation signal S_LO2 by referring to the second frequency signal S_FQ2, respectively, and outputting one of the first local oscillation signal S_LO1 and the second local oscillation signal S_LO2 to the mixer 212 when the shared receiver front-end 210 performs a reception operation.

In this embodiment, the low-noise amplifier 214 is coupled between an antenna 201 of the RF front-end 200 and the mixer 212, and arranged for receiving a received signal S_R from the antenna 201 and accordingly generating an amplified received signal S_R'. The antenna 201 is shared by the shared RX front-end 210, the first TX front-end 220 and the second TX front-end 230 via a 1-to-3 switch. The mixer 212 is arranged for mixing the amplified received signal S_R' with an LO input, derived from either the first local oscillation signal S_LO1 or the second local oscillation signal S_LO2, when the corresponding reception operation is performed.

The first TX front-end 220 is arranged for performing a transmission operation according to the first wireless communication standard (e.g. the BT standard), and the second transmitter front-end 230 is arranged for performing a transmission operation according to the second wireless communication standard (e.g. the Wi-Fi standard). The divider 270 is coupled between the mixer 122 and the LO generator 260, and arranged to provide in-phase and quadrature LO signals to the mixer 122. The in-phase and quadrature LO signals are generated from the first local oscillation signal S_LO1 or the second local oscillator signal S_LO2, depending on which LO signal is currently generated from the LO generator 260.

Please note that the first local oscillation signal S_LO1 and second local oscillation signal S_LO2 should be in a different frequency domain, such that the RF front-end 200 is operative for a time division duplexing (TDD) scheme. That is, during each time slot of the TDD scheme, only one of the first transmitter front-end 220, the second transmitter front-end 230 and the shared receiver front-end 210 is active while the remaining two are inactive. For example, during a time slot of the TDD scheme designated for the first wireless communication standard (e.g. the BT standard), the mixer 122 may mix the amplified received signal S_R' with in-phase and quadrature LO signals derived from the first local oscillation signal S_LO1 when the shared receiver front-end 210 performs the reception operation according to the first wireless communication standard. During a time slot of the TDD scheme designated for the second wireless communication standard (e.g. the Wi-Fi standard), the mixer 122 may mix the amplified received signal S_R' with in-phase and quadrature LO signals derived from the second local oscillation signal S_LO2 when the shared receiver front-end 210 performs the reception operation according to the second wireless communication standard. The first TX front-end 220 performs the transmission operation according to the first wireless communication standard (e.g. the BT standard) during the time slot of the TDD scheme designated to the first wireless communication standard, and the second transmitter front-end 230 performs the transmission operation according to the second wireless communication standard (e.g. the Wi-Fi standard) during the time slot of the TDD scheme designated to the second wireless communication standard. In short, time slots of the TDD scheme are designated for either the first wireless communication standard (e.g. the BT standard) or the second wireless communication standard (e.g. the Wi-Fi standard), and the designated time slots may only be used for either signal reception or signal transmission. During any given time slot of the TDD scheme, only one of the first TX front-end 220, the second TX front-end 230 and the shared RX front-end 210 is allowed to be in operation while the other two are not. Please note this is for illustrative purposes only, and is not meant to be a limitation of the present invention. When considering a less-occupied ambient network, it is possible that, during some time slots, the first TX front-end 220, the second TX front-end 230 and the shared RX front-end 210 are all not in operation due to lack of reception and transmission requests.

Figure 3:
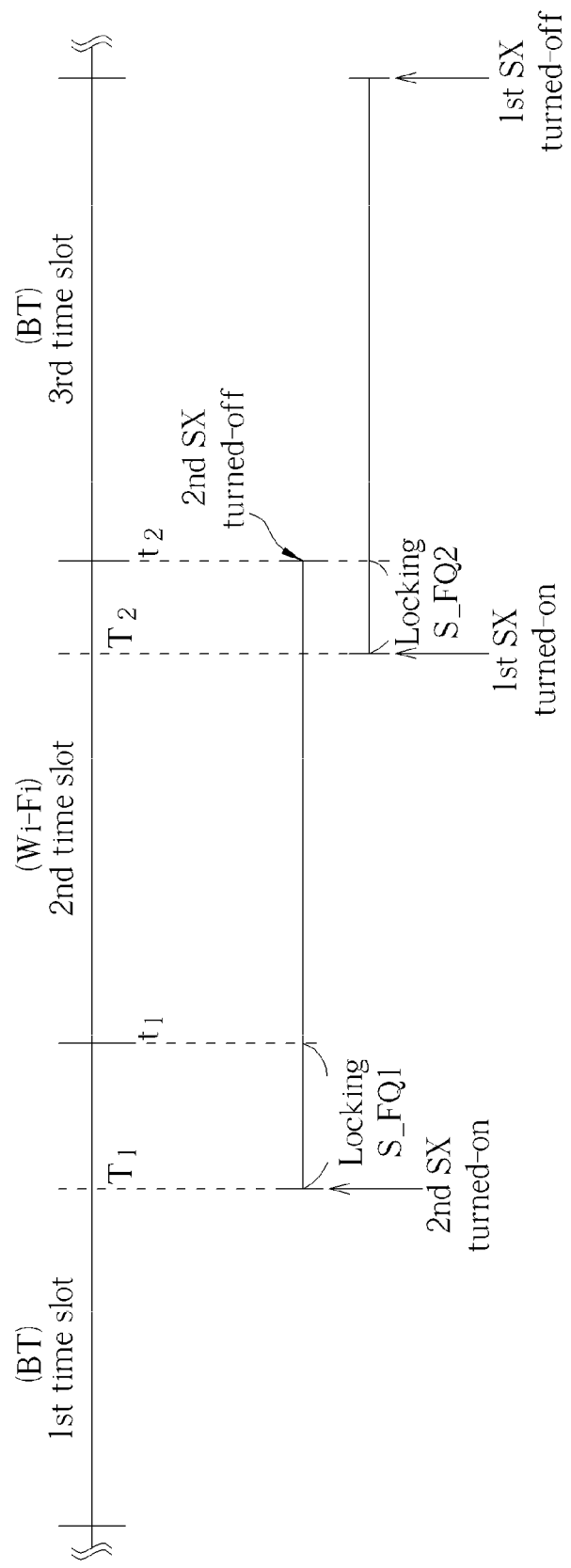
FIG. 3 is a timing diagram illustrating the pre-on mechanism of the first synthesizer and the second synthesizer.

In this embodiment, when the shared RX front-end 210 is operative for the first wireless communication standard (e.g. the BT standard), the shared RX front-end 210 operates under a first operating mode, and when the shared RX front-end 210 is operative for the second wireless communication standard (e.g. the Wi-Fi standard), the shared RX front-end 210 operates under a second operating mode. Since the RF front-end 200 is operative for the TDD scheme, the performance of the shared RX front-end 210 is highly correlated with the efficiency of the transitions between the first operating mode and the second operating mode. In order for the shared receiver front-end 210 to smooth the transitions between the first operating mode and the second operating mode, the first synthesizer 240 and the second synthesizer 250 may employ a "pre-on" mechanism. This means that the first synthesizer 240 and the second synthesizer 250 will be turned on in advance to lock/calibrate the first frequency signal S_FQ1 and the second frequency signal S_FQ2 to the desired frequencies. Please refer to FIG. 3, which is a timing diagram illustrating the pre-on mechanism of the first synthesizer 240 and the second synthesizer 250 shown in FIG. 2. In FIG. 3, the first time slot of the TDD scheme is designated for the first wireless communication standard (e.g. the BT standard), the second time slot of the TDD scheme is designated for the second wireless communication standard (e.g. the Wi-Fi standard), and the third time slot of the TDD scheme is designated for the first wireless communication standard (e.g. the BT standard). Hence, the first synthesizer 240 should be operative during the first and third time slot of the TDD scheme, and the second synthesizer 250 should be operative during the second time slot of the TDD scheme. As illustrated in FIG. 3, the second synthesizer 250 is turned on in advance at time $T_1$ in order for the second frequency signal S_FQ2 to be locked at the spectrum designated according to the second wireless communication standard during the time period between $T_1$ and $t_1$. In this way, the second frequency signal S_FQ2 will be employed at the beginning of the second time slot of the TDD scheme. Similarly, the first synthesizer 240 is turned on in advance at time $T_2$ in order for the first frequency signal S_FQ1 to be locked at the spectrum designated according to the first wireless communication standard during the time period between $T_2$ and $t_2$. In this way, the first frequency signal S_FQ2 will be employed at the beginning of the third time slot of the TDD scheme. The locking/calibrating time of the first synthesizer 240 and the second synthesizer 250 will not stand in the way of the throughput of the shared RX front-end 210. However, the order and arrangement of time slots shown in FIG. 3 is for illustrative purpose only, and the actual application of the time slot designation might be different than that of FIG. 3, for example, like BT, BT, Wi-Fi, BT, BT, Wi-Fi, or BT, Wi-Fi, BT, BT, Wi-Fi. That is, the time slot designation might not change alternatively between BT and Wi-Fi. In addition, the pre-on mechanism does not necessarily involve in every the time slot designation changes.

The pre-on mechanism implies that the first synthesizer 240 and the second synthesizer 250 will both be active for a period of a time slot operated by the TDD scheme; since the LO generator 260 is shared by the first synthesizer 240 and the second synthesizer 250, the LO generator 260 will receive the first frequency signal S_FQ1 and the second frequency signal S_FQ2 at the period of the time slot operated by the TDD scheme. Therefore, the LO generator 260 divides the first frequency signal S_FQ1 by a first divisor and divides the second frequency signal S_FQ2 by a second divisor, such that the divided first frequency signal S_FQ1' and the divided second frequency signal S_FQ2' will not interfere with each other. The LO generator 260 then generates the first local oscillation signal S_LO1 and the second local oscillation signal S_LO2, respectively.

Please note that the first TX front-end 220 and the second TX front-end 230 also share the LO generator 260. In one alternative design, the first TX front-end 220 and the second TX front-end 230 may be integrated into one TX front-end. Moreover, since the shared RX front-end 210 and the first TX front-end 220 and the second TX front-end 230 all share the same LO generator 260, in another alternative design, the shared RX front-end 210 and the first TX front-end 220 and the second TX front-end 230 may be considered as one shared front-end block for simplicity.

In short, the present invention provides a shared architecture of an RF front-end that supports multiple wireless communication standards. The RF front-end includes a shared low-noise amplifier, a shared mixer of a receiver of the RF front-end, a shared LO generation circuit, a shared IQ divider, and/or traces in between these shared elements. Chip area and pin count can both be reduced significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) front-end being operative for a time division duplexing (TDD) scheme and supporting at least a first and second wireless communication bands, comprising:
   a shared receiver front-end comprising:
      a mixer, for mixing a received signal with a first local oscillation signal when the shared receiver front-end performs the reception operation via the first wireless communication band during a time slot of the TDD scheme designated for the first wireless communication band, and mixing the received signal with a second local oscillation signal when the shared receiver front-end performs the reception operation via the second wireless communication band during a time slot of the TDD scheme designated for the second wireless communication band, wherein the first and second local oscillation signals are different in frequency.

2. The RF front-end of claim 1, wherein the first and second wireless communication bands are included in specified spectrums defined by at least one of a first and second wireless communication standards.

3. The RF front-end of claim 1, further comprising:
   a first transmitter front-end arranged for performing a transmission operation according to the first wireless communication standard; and
   a second transmitter front-end arranged for performing a transmission operation according to the second wireless communication standard;
   wherein during each time slot of the TDD scheme, only one of the first transmitter front-end, the second transmitter front-end and the shared receiver front-end is active while remaining two are inactive.

4. The RF front-end of claim 2, further comprising:
   a first synthesizer, arranged for generating a first frequency signal;
   a second synthesizer, arranged for generating a second frequency signal; and
   a local oscillation (LO) generator, arranged for generating the first and second local oscillation signals by referring to the first and second frequency signals, respectively, and outputting one of the first local oscillation signal and the second local oscillation signal to the mixer when a corresponding reception operation is performed.

5. The RF front-end of claim 4, wherein the first synthesizer and the second synthesizer are both active for a period of a time slot operated by the TDD scheme.

6. The RF front-end of claim 2, wherein the first wireless communication standard is a wireless fidelity (Wi-Fi) standard, and the second wireless communication standard is a Bluetooth (BT) standard.

7. A radio-frequency (RF) front-end supporting at least a first and second wireless communication bands, comprising:
- at least one transmitter front-end arranged for performing a transmission operation via the first wireless communication band;
- a shared receiver front-end for performing a reception operation via either the first wireless communication band or the second wireless communication band;
- a first synthesizer, arranged for generating a first frequency signal;
- a second synthesizer, arranged for generating a second frequency signal; and
- a local oscillation (LO) generator, arranged for generating a first and second local oscillation signals by referring to the first and second frequency signals, respectively, and outputting one of the first local oscillation signal and the second local oscillation signal to one of the transmitter frond-end and the shared receiver front-end when a corresponding operation is performed, wherein the first and second local oscillation signals are different in frequency;
- wherein the RF front-end is operative for a time division duplexing (TDD) scheme.

8. The RF front-end of claim 7, wherein the first and second wireless communication bands are included in specified spectrums defined by at least one of a first and second wireless communication standards.

9. The RF front-end of claim 8, wherein the first synthesizer and the second synthesizer are both active for a period of a time slot operated by the TDD scheme.

10. The RF front-end of claim 8, wherein the first wireless communication standard is a wireless fidelity (Wi-Fi) standard, and the second wireless communication standard is a Bluetooth (BT) standard.

11. A radio-frequency (RF) front-end supporting at least a first and second wireless communication bands, comprising:
- a shared front-end for performing an operation via to either the first wireless communication band or the second wireless communication band;
- a first synthesizer, arranged for generating a first frequency signal;
- a second synthesizer, arranged for generating a second frequency signal; and
- a local oscillation (LO) generator, arranged for generating a first and second local oscillation signals by referring to the first and second frequency signals, respectively, and outputting one of the first local oscillation signal and the second local oscillation signal to the shared front-end when a corresponding operation is performed,
- wherein the RF front-end is operative for a time division duplexing (TDD) scheme, and the first synthesizer and the second synthesizer are both active for a period of a time slot operated by the TDD scheme.

12. The RF front-end of claim 11, wherein the first and second wireless communication bands are included in specified spectrums defined by at least one of a first and second wireless communication standards.

13. The RF front-end of claim 12, wherein the first wireless communication standard is a wireless fidelity (Wi-Fi) standard, and the second wireless communication standard is a Bluetooth (BT) standard.

* * * * *